(12) United States Patent
Yokoyama

(10) Patent No.: US 6,374,489 B1
(45) Date of Patent: Apr. 23, 2002

(54) METHOD FOR MANUFACTURING CAMSHAFT

(75) Inventor: Michihiro Yokoyama, 42, Minamine, Nesaki-cho, Anjo-city, Aichi Pref, Anjo (JP)

(73) Assignees: Michihiro Yokoyama; Akegawa Electric Corporation Co. Ltd., both of Osaka (JP)

( * ) Notice: Subject to any disclaimer, the term of this patent is extended or adjusted under 35 U.S.C. 154(b) by 0 days.

(21) Appl. No.: 09/573,337

(22) Filed: May 18, 2000

(30) Foreign Application Priority Data

May 19, 1999 (JP) .............................. 11-138140

(51) Int. Cl.⁷ ................................ B23P 15/00
(52) U.S. Cl. ........................ 29/888.1; 29/523
(58) Field of Search ................ 29/888.1, 523, 29/283.5; 74/527; 123/90.6

(56) References Cited

U.S. PATENT DOCUMENTS

| | | | | |
|---|---|---|---|---|
| 4,450,609 A | * | 5/1984 | Hamilton ................ | 29/888.1 |
| 5,259,268 A | * | 11/1993 | Ebbinghaus et al. ......... | 74/567 |
| 5,280,675 A | * | 1/1994 | Orsini, Jr. ............... | 29/888.1 |
| 5,435,207 A | * | 7/1995 | Orsini, Jr. ............... | 74/567 |
| 5,992,017 A | * | 11/1999 | Grafchev et al. .......... | 29/888.1 |

FOREIGN PATENT DOCUMENTS

| | | |
|---|---|---|
| JP | A 53-102861 | 9/1978 |
| JP | 53/102861 | 9/1978 |
| JP | 2531656 | 6/1996 |
| JP | B 2531656 | 6/1996 |
| JP | 9-100703 | 4/1997 |
| JP | A 9-100703 | 4/1997 |

* cited by examiner

Primary Examiner—I. Cuda-Rosenbaum
(74) Attorney, Agent, or Firm—Armstrong, Westerman & Hattori, LLP

(57) ABSTRACT

A method for manufacturing a camshaft by inserting a hollow shaft 3 made of steel into an axial hole 400 of a cam lobe 4 made of a sintered alloy, by expanding the hollow shaft 3 by inserting a mandrel 1 into the hollow shaft 3, and by joining and fixing the expanded hollow shaft 3 and the cam lobe 4 while avoiding the constriction that might otherwise be caused by the retraction of the mandrel 1 inserted, of the expanded hollow shaft 3. The method includes an expanding step using a diverging long face 200, which is so formed on the leading head of the mandrel 1 as to diverge at an angle of about 8 to 30 degrees with respect to the axis toward the trailing end, and a bulging portion 2 formed to lead from the diverging face 200; and an expanding step using the bulging portion 2 of the mandrel 1 and a converging short face 201 which is formed so as to lead from the bulging portion 2 and to converge at an angle of about 8 to 30 degrees with respect to the axis toward the trailing end.

2 Claims, 5 Drawing Sheets

METHOD FOR MANUFACTURING CAMSHAFT

BACKGROUND OF THE INVENTION

1. Field of the Invention

The present invention relates to a method for manufacturing a camshaft and a mandrel for use in the method.

2. Related Art

A method for manufacturing a camshaft by expanding and jointing a cam lobe (or cam piece) and a hollow shaft (e.g., a tubular member, a shaft tube or a pipe) is known to provide excellent results in lightening the camshaft structure for high-speed rotation and low fuel consumption and in reduction of exhaust emissions for protecting the environment. Publications relating to the invention will be enumerated in the following.

Publication (1); Examined Published Japanese Patent Application No. 46-21299 relating to a method for shaping a camshaft. There is disclosed a structure in which a shaft tube and a cam, a journal or the like are jointed by setting the cam, the journal or a shaft head in a split mold, by inserting the shaft tube into the axial hole of the journal and by radially enlarging (or expanding) the shaft tube through a die (or mandrel). This structure is intended to manufacture the camshaft easily through the split mold and the die and to lower the manufacture cost.

Publication (2): Unexamined Published Japanese Patent Application No. 5-288014 relating to a camshaft. There is disclosed a structure in which the camshaft is assembled from a camshaft made of a sintered alloy and a camshaft made of a steel pipe by constructing an inner piece and a hollow shaft of an easily expandable steel and by expanding and jointing them with a high-pressure fluid and a mandrel. This structure is intended to lower the assembly cost and to prevent the cam piece from being broken during assembly and in use.

Publication (3): Unexamined Published Japanese Patent Application No. 53-102861 relating to a method for jointing a ring to a hollow shaft. There is disclosed a structure in which the ring (or cam) on the hollow shaft is fixed in the tuning direction and in the axial direction by forming paddings on the two sides of the ring of the hollow shaft.

Publication (4): Unexamined Published Japanese Patent Application No. 8-158817 relating to a method for manufacturing an assembly-type camshaft. There is disclosed a structure in which a projection of a shaft is registered with a groove of a cam (or cam lobe) and is bulged and press-fitted in the groove by expanding the shaft. This structure is intended to fix the cam firmly.

Publication (5): Unexamined Published Japanese Patent Application No. 9-100703 relating to an expansion assembly type of hollow camshaft. There is disclosed a structure in which a hollow shaft and a cam lobe are integrally jointed and assembled by knurling the hollow shaft and by expanding the hollow shaft through a mandrel having a worked head of a splined sectional shape to join and integrate the knurled portion and the cam lobe during the expansion. This structure is intended to work the inner circumference inexpensively with high accuracy and to lower the cost while preventing the cam lobe from being broken.

SUMMARY OF THE INVENTION

In Publication (1), no special means is provided in the shape and operation off the die. As a result, the expanded shaft tube may often be temporarily constricted to loosen the joint between the shaft tube and the cam, the journal or the like, once jointed. Since the inclination angle of the die is arbitrary, on the other hand, there may be drawing residuals at the time of expansion, and the shaft tube may be elongated. This leaves an unsolved problem, that a camshaft of high accuracy cannot be manufactured.

In Publication (2), the cam piece is provided with the inner piece, and the inner piece and the shaft are provided with radially larger and smaller portions. As a result, the structure is complicated and leaves unsolved the problem that the camshaft cannot be provided at a low cost. Here, this structure is not devised on the inclination angle of the mandrel so that it seems to have a problem similar to that of Publication (1).

Publication (3) provides the relation between the paddings of the hollow shaft and the ring (or cam). However, there are no means for preventing the expanded pipe from returning or for the inclination angle of the mandrel. Here, this structure seems to have a problem similar to that of Publication (1).

Publication (4) provides a structure for bulging and press fitting the projection into the groove of the cam (or cam lobe) by expanding the shaft. However, there are no means for preventing the expanded pipe from returning or for the inclination angle of the mandrel. Here, this structure seems to have a problem similar to that of Publication (1).

Publication (5) provides a structure for joining and integrating the knurled portion and the cam lobe during the expansion. There is no device for preventing the expanded pipe from returning. As a result, this structure seems to have a problem similar to that of Publication (1). On the other hand, the mandrel of the structure has the worked head of the splined sectional shape. However, there is no device for the inclination angle. Here, this structure seems to have a problem similar to that of Publication (1).

It is, therefore, an object of the invention to solve the problems of the prior art, as specified in connection with the publications.

DESCRIPTION OF THE PREFERRED EMODIMENT

Figure 1:
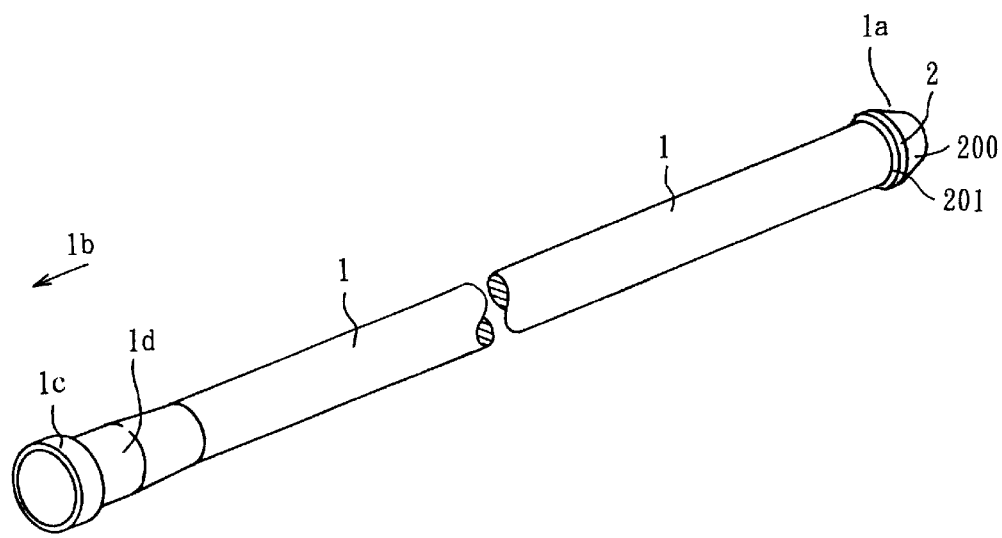
FIG. 1 is a partially omitted perspective view showing a mandrel of the invention.
Figure 2:
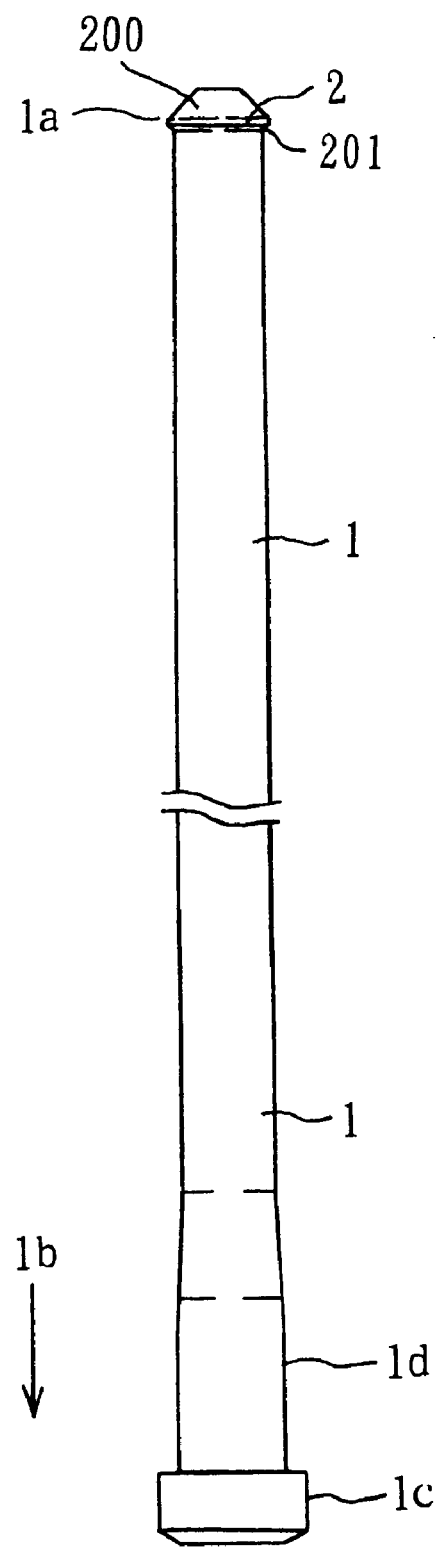
FIG. 2 is a partially omitted front elevation showing the mandrel of the invention.
Figure 3:
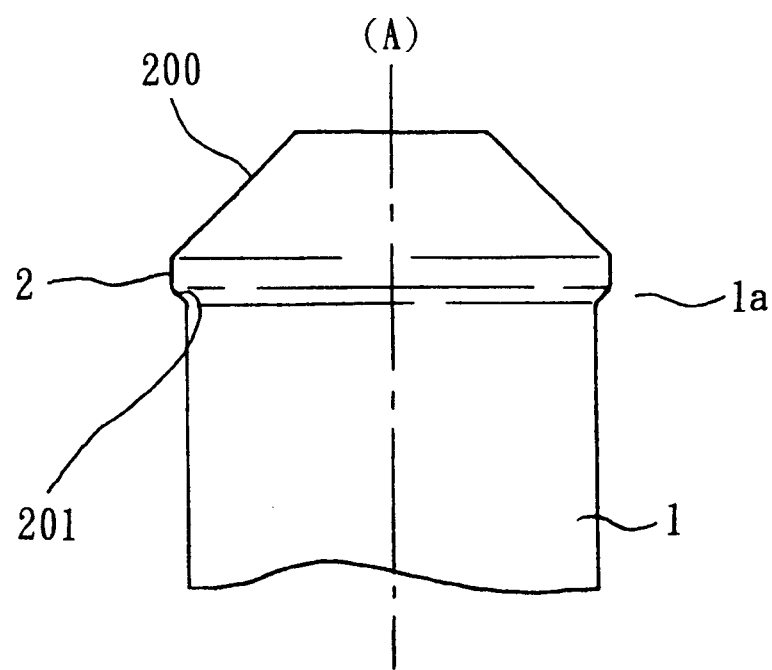
FIG. 3 is an enlarged front elevation showing an essential portion of FIG. 1.
Figure 4:
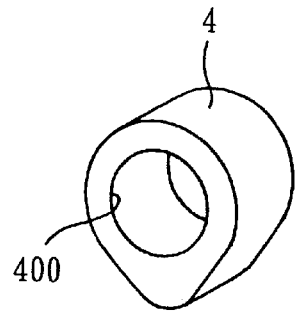
FIG. 4 is a perspective view showing a cam lobe of the invention.
Figure 5:
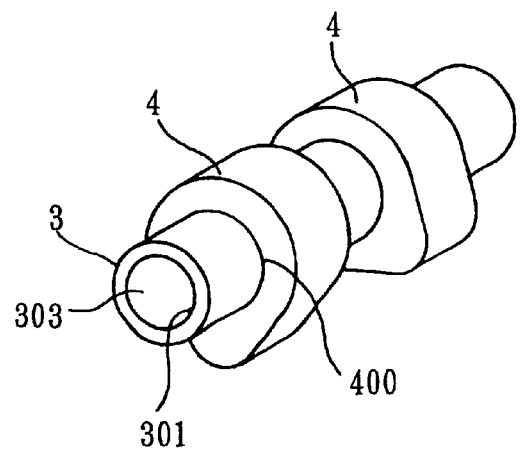
FIG. 5 is a perspective view showing an essential portion of one example of a joint assembly of a hollow shaft and the cam lobe of the invention.

A cam lobe made of a sintered alloy is set in a mold, one preferred example of which will be described. This mold is of a rotary type, which is provided with one or a plurality of (plurality not illustrated) chambers capable of setting one or a plurality of (plurality not illustrated) cam lobes. Into the axial hole of the cam lobe set in the chamber, there is inserted a hollow shaft of steel in a generally perpendicular (or linear) direction. After the positional relation between the cam lobe and the hollow shaft is determined by that operation, the leading head of a mandrel is inserted into the through hole of the hollow shaft to expand the through hole of the hollow shaft. At this time, the hollow shaft is primarily expanded by making use of a diverging long face, which is so formed on the leading head of the mandrel as to diverge at an angle of about 8 to 30 degrees (desirably, about 10 to 25 degrees) with respect to the axis (A) toward the trailing end of the mandrel, and a bulging portion which is formed to lead from that diverging long face. In this primary expansion, it is possible to expand (or elastically deform) the hollow shaft reliably with the bulging portion having the diverging long face, and it is further possible to eliminate troubles such as the drawing residuals at the time of expanding and the extension of the hollow shaft. After this primary expansion, in order to avoid the return (or constriction) of the expanded tube, a secondary expansion (to avoid the constriction) is performed by using the mandrel, which has the bulging portion and a converging short face formed to lead from the other end (or trailing end) of the bulging portion and converging at an angle of about 8 to 30 degrees (desirably, about 10 to 25 degrees) with respect to the axis (A) toward the trailing end of the mandrel, and/or by using a method of retracting the mandrel at least one time. It is possible to manufacture a camshaft which has a joint assembly of the hollow shaft expanded by those primary and secondary expansions and the cam lobe. The camshaft thus completed is extracted from the chamber. At this extracting time or at the manufacturing time, there are performed continuously or intermittently the operations to set a cam lobe in another chamber or to insert the hollow shaft into the same chamber. Naturally, the operations to manufacture the camshaft, to set the cam lobe or to insert the hollow shaft can be individually performed.

Here, the invention is characterized in that the hollow shaft can be prevented from moving in the turning direction or in the axial direction by adopting a construction in which a ridge portion is formed on the outer circumference of the hollow shaft so tat the cam lobe is fixed while pressing the ridge portion.

Figure 6:
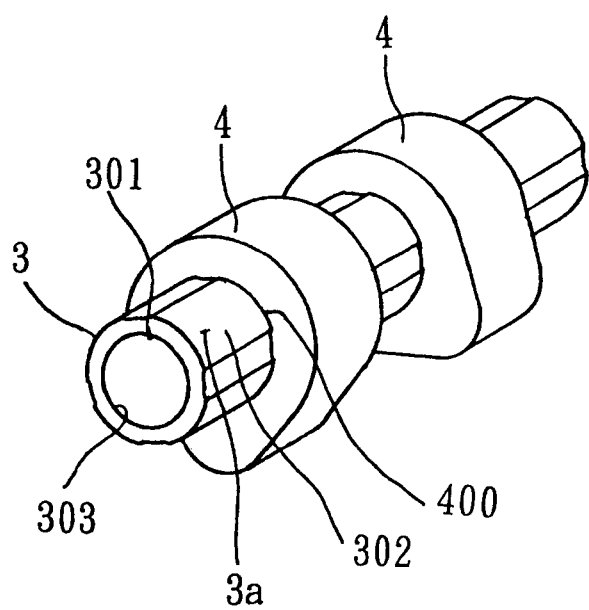
FIG. 6 is a perspective view showing an essential portion of another example of a joint assembly of the hollow shaft and the cam lobe of the invention.

Now will be described a mandrel 1 to be used in a method for manufacturing a camshaft. This mandrel 1 has a bulging portion 2 formed at its leading head 1a. On this bulging portion 2, there are formed: a diverging long face 200 which diverges at an angle of about 8 to 30 degrees with respect to an axis (A) toward the trailing end 1b of the mandrel 1; and a converting short face 201 which converges at an angle of about 8 to 30 degrees with respect to the axis (A) toward the trailing end 1b of the mandrel 1. A hollow shaft 3 can be reliably expanded by the diverging long face 200 of the mandrel 1. It is possible at the time of expansion to eliminate the drawing residuals and to avoid the elongation of the hollow shaft 3. Moreover, a through hole 303 is smoothed on its expanded inner face 301. On the other hand, the converging short face 201 of the mandrel 1 expands the hollow shaft 3 in the constricted state. In other words, the returning operation of the mandrel 1 and/or the converging short face 201 of the mandrel 1 is utilized to eliminate the constriction of the hollow shaft 3 thereby to avoid any slackness of the hollow shaft 3 and a cam lobe 4 which is to be described. This cam lobe 4 has an axial hole 400, into which the hollow shaft 3 is inserted. In another example of FIG. 6, the cam lobe 4 can be prevented from moving in the taming direction and in the axial direction by adopting a construction in which one or a plurality of ridge portions 302 are formed on the outer circumference 3a of the hollow shaft 300 to fix the cam lobe 4 while pressing the ridge portion 302.

In the Drawings, numeral 1c designates a bulge for chucking the mandrel 1, and numeral 1d designates a bulging portion of the mandrel 1. On the other hand, the joint portions between the bulging portion 2 and the diverging long face 200 and between the bulging portion 2 and the converting short face 201 are likewise rounded.

According to the invention there is provided a method for manufacturing a camshaft by inserting a hollow shaft made of steel into an axial hole of a cam lobe made of a sintered alloy, expanding the hollow shaft by inserting a mandrel into the hollow shaft, and jointing and fixing the expanded hollow shaft and the cam lobe while avoiding the constriction might otherwise be caused by the retraction of the inserted mandrel from the expanded hollow shaft. The method comprises an expanding step using a diverging long face, which is so formed on the leading head of the mandrel as to diverge at an angle of about 8 to 30 degrees with respect to the axis toward the trailing end, and a bulging portion formed to lead from the diverging face; and an expanding step using the bulging portion of the mandrel and a converging short face which is so formed as to lead from the bulging portion and to converge at an angle of about 8 to 30 degrees with respect to the axis toward the trailing end. By the operations of the primary and secondary expansions utilizing the shape of the mandrel and the insertion and retraction, therefore, the expanded hollow shaft is not temporarily constricted so that the joint of the hollow shaft and the cam lobe is not loosened once they are joined and assembled, Alternatively, the angles of the faces of the mandrel are set, and the primary and secondary expansions are made with the diverging long face and the converging short face. As a result, the drawing residuals can be eliminated at the time of expansion, and the hollow shaft can be prevented from being elongated so that the camshaft can be manufactured to have a high accuracy.

According to the invention there is provided a mandrel to be used in a method for manufacturing a camshaft by inserting a hollow shaft made of steel into an axial hole of a cam lobe made of a sintered alloy, inserting the mandrel into the hollow shaft, by expanding the hollow shaft with the leading head of the mandrel, and joining and fixing the expanded hollow shaft and the cam lobe. The mandrel comprises: a diverging long face formed on the leading head of the mandrel and diverging at an angle of about 8 to 30 degrees with respect to the axis toward the trailing end of the mandrel; a bulging portion formed to led from the diverging face; and a converging short face formed to lead from the bulging portion are converging at an angle of about 8 to 30 degrees with respect to the axis toward the trailing end of the mandrel. The divering long face and the converging short face have substantially equal angles. By making use of the shape of the mandrel for the primary and secondary expansions, therefore, the expanded hollow shaft is not temporarily constricted so that the joint of the hollow shaft and the cam lobe is not loosened once they are joined and assembled. Alternatively, the angles of the faces of the mandrel are set, and the primary and secondary expansions are made with the diverging long face and the converging short face. As a result, the drawing residuals can be eliminated at the time of expansion, and the hollow shaft can be prevented from being elongated so that the camshaft can be manufactured to have a high accuracy.

What is claimed is:

1. A method for manufacturing a camshaft by inserting a hollow shaft made of steel into an axial hole of a cam lobe made of a sintered alloy, by expanding said hollow shaft by inserting a mandrel into said hollow shaft, and by jointing and fixing said expanded hollow shaft and said cam lobe while avoiding the constriction, as might otherwise be caused by the retraction of said mandrel inserted, of said expanded hollow shaft comprising:

a primary expanding step using a diverging long face, which is so formed on the leading head of said mandrel as to diverge at an angle of about 8 to 30 degrees with respect to the axis toward the trailing end, and a bulging portion formed to lead from said diverging face; and a secondary expanding step using the bulging portion of said mandrel and a converging short face which is so formed to lead from said bulging portion as to converge at an angle of about 8 to 30 degrees with respect to the axis toward the trailing end.

2. A mandrel to be used in a method for manufacturing a camshaft by inserting a hollow shaft made of steel into an axial hole of a cam lobe made of a sintered alloy, by inserting said mandrel into said hollow shaft, by expanding said hollow shaft with the leading head of said mandrel, and by jointing and fixing said expanded hollow shaft and said cam lobe, comprising:

a diverging long face formed on the leading head of said mandrel and diverging at an angle of about 8 to 30 degrees with respect to the axis toward the trailing end of said mandrel;

a bulging portion formed to lead from said diverging face; and a converging short face formed to lead from said bulging portion and converging at an angle of about 8 to 30 degrees with respect to the axis toward the trailing end of said mandrel, wherein said diverging long face and said converging short face have substantially equal angles.

* * * * *